Figure 1:
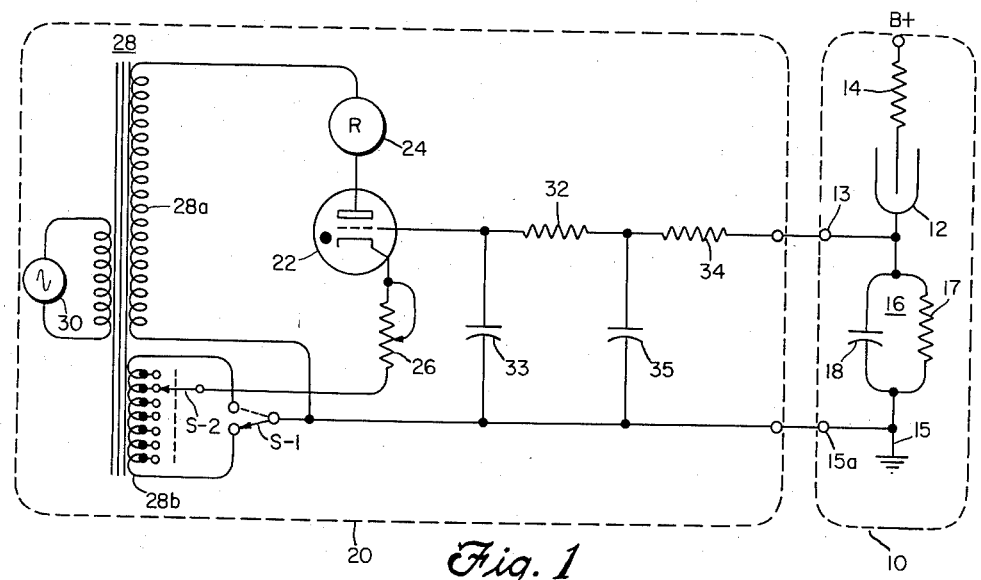

Dec. 20, 1960     J. G. CRUMP     2,965,760
RADIATION MEASURING DEVICE
Filed March 19, 1959

Inventor
Jack G. Crump
By Anthony D. Cennamo

United States Patent Office 2,965,760
Patented Dec. 20, 1960

2,965,760
RADIATION MEASURING DEVICE

Jack G. Crump, Columbus, Ohio, assignor to Industrial Nucleonics Corporation, a corporation of Ohio Filed Mar. 19, 1959, Ser. No. 800,555

7 Claims. (Cl. 250—83.6)

This invention relates to a radiation detector and more particularly to detectors of a type adapted to measure radiation levels and thereby actuate external means when such radiation attains predetermined levels.

In general, the apparatus of the present invention includes a unit for detecting radiation and a unit for actuating a suitable external means for the purposes intended as such radiation accordingly increases or decreases to a predetermined intensity. Specifically, the detector unit includes a Geiger-Mueller tube and a high-impedance load network. The actuator unit includes a grid control thyratron tube with an associated plate circuit relay having moveable contacts electrically connected in an external circuit, as, for example, an alarm circuit. The manner in which the detector unit and the actuator unit are interconnected results in an On-Off or similar switching operation having what is termed here a hysteresis characteristic or "dead-band." Moreover, means are provided to control the width of such a "dead-band." A complete description will be found hereinafter.

To provide a radiation detector having such a controllable "dead-band" is to supply the answer to a need of long standing—a need for reliable annunciating apparatus which is actuated whenever the existing radiation level attains some predetermined level, possibly the limit beyond which human life becomes endangered; a need also for an economical control means for industrial processes where simple binary operations are to be performed and not necessarily about some specified operational point but rather in a manner closely analogous operationally to a lost-motion linkage.

With the above in mind, it is a primary object of the present invention to provide a radiation detector of the type to be described for measuring the intensity of radiation and actuating external devices in response thereto.

It is another object of the present invention to provide a radiation detector of the type described herein which is adapted to actuate an alarm means whenever the level of radiation impinging on said detector attains some predetermined level.

It is another object of the present invention to employ novel electronic circuitry for inserting an adjustable, operational "dead-band" in a radiation detector of the type to be described, which circuitry provides the means for controlling the response characteristic of an associated alarm means so that same is inhibited from sporadic operation whenever the existing level of radiation is substantially equal to some prescribed level.

It is still another object of the present invention to provide a radiation detector of the type to be described whereby external circuit means are operable binarily around some predetermined radiation level.

It is still a further object of the present invention to provide a simplified radiation detector of a type adaptable to binary On-Off operations wherein said operations are selectively biased to occur at different radiation levels.

Another object of the present invention is to provide a simplified radiation detector of the type to be described wherein provisions are incorporated for selectively varying the extent of which an external circuit means operates binarily around some predetermined radiation level.

Another object of the present invention is a radiation measuring device and controller of the type described herein which comprises simplicity in design, economy in manufacture, and reliability in operation and service.

Figure 2:
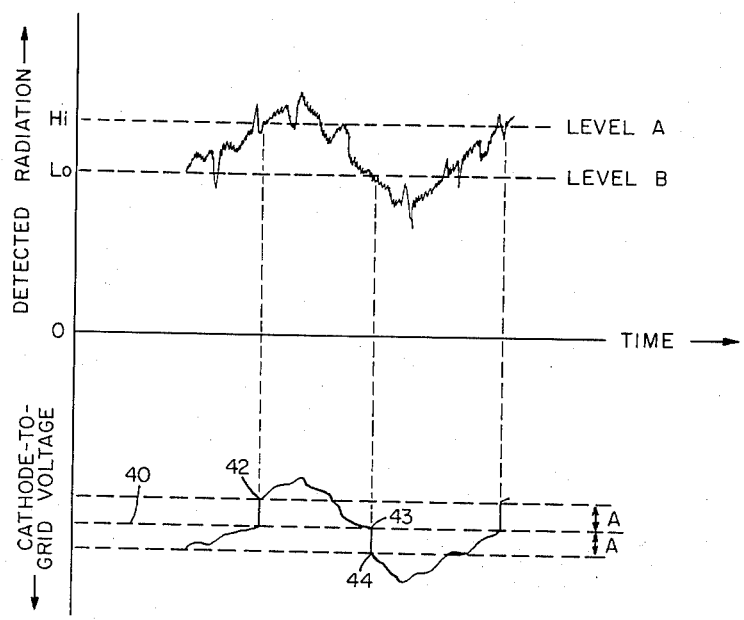

These and further objects of the present invention will be understood upon considering the following description taken in conjunction with the drawing in which:

Figure 1 is a schematic diagram of the radiation detector comprising the present invention; and Figure 2 graphically describes a typical waveform of the voltage as seen at the grid of the thyratron tube of the present invention and shows the "dead-band" described herein. A typical curve representing variations in existing radiation levels from which the aforesaid voltage waveform is developed is also shown.

Referring first to Figure 1 of the drawing, the radiation detector of the present invention comprises a detector unit 10 and an actuator unit 20. The detector unit 10 includes a Geiger-Mueller tube 12, such as an Anton type 310 halogen quenched tube or equivalent, connected at one terminal thereof to a source of positive electric potential, indicated as B+, through a resistor 14. The other terminal of tube 12 is connected to ground 15 through a load network 16 consisting of a parallel combination of resistor 17 and capacitor 18. Resistor 17 is restricted to very large impedances of the order of fifty (50) to one hundred (100) megohms. In the embodiment shown in Figure 1, the time constant of load network 16 is preferably large, in the order of five (5) seconds. It is not intended here to limit the scope of this invention to the load network shown and described in this, the preferred embodiment.

Techniques relating to the theory and operation of Geiger-Mueller tubes are well known, and therefore, a description of these techniques is excluded. It suffices here to point out generally that as radiation is received at the Geiger-Mueller tube, ionization takes place with a resultant current flow in the detector circuit. This current or, more correctly, pulse of current, and all subsequent pulses resulting from subsequent breakdowns, are integrated or averaged by the aforesaid RC combination of load network 16. The result of this integration is an average D.C. voltage indicative of the magnitude of radiation received at the Geiger-Mueller tube 12. Thus, detector unit 10 detects the presence of radiation and measures same by integrating the current resulting from individual pulse breakdowns of the tube.

With continued reference to Figure 1, the actuator unit 20 includes a thyratron tube 22, a plate circuit relay 24, a potentiometer 26, and a transformer 28 having two secondary windings 28a and 28b to inductively connect a source 30 of A.C. power to the circuit.

A first switch S–1 of a conventional type is provided to reverse the polarity or phase of an A.C. bias voltage, and a second switch S–2, of the conventional rotary type preferably, is provided so that adjustments as to amplitude of this A.C. bias voltage can readily be accomplished. The respective setting of these two switches, for example, may determine the radiation level at which the thyratron will or will not fire and what change in the level of radiation is necessary before the thyratron is respectively extinguished or again fired.

The grid of thyratron 22 is connected to terminal 13 of detector unit 10 through resistors 32 and 34 and is further connected to ground 15 through capacitors 33 and 35. Thus, it is seen that the voltage developed across load network 16 of detector unit 10 is the input voltage applied to the grid of thyratron 22.

It should be pointed out that the grid circuit impedance in the instant case is extremely high, ranging between eight (8) and thirteen (13) times the maximum impedance recommended by tube manufacturers. For example, a type 2D21 thyratron was found to function properly even though the factory recommended maximum grid circuit impedance of ten (10) megohms was exceeded in one case by a factor of seven and in another case by a factor of twelve.

It is well known that grid current even in the order of a microampere may produce very disturbing effects when such currents flow in high-impedance grid circuits. In the present invention, however, the inventor takes advantage of the increased grid voltage resulting from the positive ion current flowing whenever the thyratron is fired. Operationally, this increased grid voltage results in a switching action having a hysteresis characteristic preferably called a "dead-band," which switching action is mechanically analogous to a lost-motion linkage actuating a conventional On-Off switch.

An operational description of the instant invention follows assuming first that switch S–1 and terminals 13 and 15 are disposed and connected respectively as shown in Figure 1. In this event, as the level of radiation received at the Geiger-Mueller tube 12 increases, the D.C. voltage developed across the load circuit 16 increases, terminal 13 accordingly being positive in polarity. Moreover, the plate and cathode voltages applied to thyratron 22 are in phase, the amplitude of the latter being selectively set by the appropriate position of switch S–2. Thus, in this instance, the grid and plate voltages with respect to the cathode are clearly opposite in phase.

The output voltage of the detector unit 10 is added to the A.C. grid bias signal through the RC network comprising resistors 32 and 34 and capacitors 33 and 35. By proper choice of components, the time constant of this network results, for all practical purposes, in the D.C. component of the grid signal instantaneously following the D.C. voltage developed and available at terminal 13 of detector unit 10. However, since the time constant of load network 16 is relatively long, preferably in the order of five (5) seconds, a sudden instantaneous change in radiation by a significant amount either way will not result in a corresponding instantaneous change in the output voltage of detector unit 10 by a proportional amount. Rather, approximately two-thirds (⅔) of such a voltage change will be completed in approximately five (5) seconds after said sudden change in radiation level. Thus, it is understood that (1) the extent of change in radiation level, (2) the time constant of the load network 16, and (3) the voltage drop attributed to grid current flow are all factors interdependent as to when the thyratron tube 22 will be fired or extinguished.

By way of example, suppose an alarm device is to be actuated whenever a prescribed radiation level is exceeded. Such a device conceivably may be one for safeguarding human life from needless exposure to excessive radiation levels or may be one for controlling industrial processes as disclosed in this inventor's co-pending United States patent application Serial No. 780,501, filed December 15, 1958, under the title of "Tank Level Measurement System."

Accordingly, thyratron 22 is biased to fire at the occurrence of some predetermined level of radiation. Thus, when this predetermined level of radiation is attained and under such conditions in time that the average current flowing in the detector unit 10 results in a D.C. voltage across load network 16 of that value necessary to drive the A.C. grid signal far enough positive so that the instantaneous grid potential with respect to the cathode is equivalent to the critical voltage necessary to fire the thyratron, then at this instant, the thyratron 22 will be fired. Thence, plate circuit relay 24 will be energized resulting in the closure of its associated contacts to actuate the aforesaid alarm device to indicate the occurrence of an excessive level of radiation.

With the thyratron 22 now fired, positive ion current flows in the grid circuit through resistors 32, 34 and 17 to ground at 15, and the resulting voltage drives the grid further positive as shown at 42 in Figure 2. Thyratron 22 continues to fire during the succeeding half cycles, as does the alarm device continue in operation, until the radiation decreases in time to that level at which the sum of the voltages developed across load network 16 and that resulting from positive ion current flow in the grid circuit of thyratron 22 is insufficient to maintain conduction of thyratron 22. Reference numeral 43 of Figure 2 is indicative of the resultant grid voltage developed at this reduced level of radiation, level B of Figure 2. At this time, the alarm device reverts to an inoperative status indicating radiation levels lower than the predetermined one.

As soon as the thyratron 22 ceases to be fired, the grid signal is driven further negatively by the amount of the voltage directly attributable above to the positive ion current flow. Being driven further negative is another way of saying that the average voltage developed across load network 16, at that instant when thyratron 22 is extinguished, is essentially that shown at 44 in Figure 2. Thus, the potential difference between reference numerals 42 and 40 as well as between 44 and 40, in Figure 2, is essentially that voltage directly attributable to positive ion current flowing in the grid circuit during the conduction period of thyratron 22.

It should be clear that the instant invention has utilized the effects of the normally undesirable grid current to provide a significant improvement in the operation of a thyratron which would otherwise operate sporadically about that level of radiation which results in, depending in the instant case on the amplitude of the inserted A.C. bias, the grid potential becoming equivalent to the critical grid firing potential as shown, by way of exemplication, at 40 in Figure 2.

It follows, then, that the bias determines the value of the D.C. voltage which necessarily must be inserted in the grid circuit to drive the grid to the critical firing potential. Once this condition is reached, the thyratron is fired and the grid is driven further positive by the additional voltage resulting from positive ion current flow. Thus, even if the radiation level were to be decreased immediately to either just below or substantially below the selected predetermined radiation level, no operational change in thyratron 22 would normally take place because of the relatively long time constant of the load network 16. Thus, the thyratron is not extinguished immediately and, in this way, is prevented from conducting and non-conducting alternately, in rapid succession, in a more or less "hunting" mode of operation. In a similar manner, as the grid potential decreases subsequently to the critical firing potential, the thyratron is extinguished and the grid is driven further negative by an amount equivalent to the voltage drop previously resulting from the aforesaid positive ion current flow. Again, if a similar change in radiation level were to occur suddenly, i.e., should the radiation level be increased immediately to either just above or substantially above the said predetermined radiation level, again no operational change in thyratron 22 would normally take place for like reasons mentioned directly above.

From the foregoing, it should be apparent now that thyratron 22 conducts initially at a higher level than that level of radiation at which conduction can no longer be maintained. In Figure 2, level A represents the radiation level at which thyratron 22 conducts under certain arbitrarily chosen bias conditions. Similarly, level B represents that lower level at which the conduction of thyratron 22, if so conducting, would be terminated. Figure 2 also shows typical time variations of grid voltages resulting from corresponding time variations in radiation levels.

Interchanging the connections of terminals 13 and 15 and, further, switching S–1 to that as shown in dotted de-lineation results in the thyratron 22 being fired as the radiation level decreases to some preset level. The former results in reversing the polarity of the D.C. voltage available at the detector unit 10, and the latter in reversing the phase of the A.C. grid bias signal. Basically, the operation of the present invention is unchanged and therefore warrants no repeat at this point.

Reference is again made to Figure 2 and more particularly to the letter reference "A" indicated thereon as the difference between the grid potentials marked by numeral references 40, 42, and 44. It should be understood that this difference "A" is that portion of the grid voltage which is directly attributable to positive ion current flowing when thyratron 22 is conducting. Under this condition, the cathode terminal of the thyratron is more positive than the grid terminal. Therefore by controlling this grid to cathode potential difference, it is possible to vary or control the voltage drop "A"; such control is accomplished by potentiometer 26.

Up to this point, the present invention has heretofore been described as if the potentiometer 26 was nevertheless included in the plate-cathode circuit but accordingly adjusted so as to by-pass or shunt the resistance winding associated therewith. By proper setting of potentiometer 26, small changes in positive ion current flow can be affected which, in turn, alters the voltage drop "A" proportionally. The resultant overall effect of potentiometer 26 is, therefore, a means for selectively altering the output characteristics of the radiation detector comprising the instant invention.

While there have been shown and described and pointed out the fundamental novel features of the invention as applied to a preferred embodiment, it will be appreciated that various omissions and substitutions as well as changes in form and operation may be made by those skilled in the art without departing from the spirit of the instant invention. It is the intention, therefore, to be limited only as indicated by the scope of the following claims.

What is claimed is:

1. In combination with a radiation detector providing a first electrical voltage having magnitude proportional to detected radiation intensity, switching apparatus comprising a source of current, means connected to said current source responsive to the magnitude of said first electrical voltage for initiating a unidirectional current flow from said source whenever said magnitude exceeds a first predetermined value, means for establishing a path for said current flow, means responsive to said current flow for generating a second electrical voltage, means for establishing the magnitudes of said first and said second electrical voltages in series aiding relationship to further increase said magnitude excess from said first predetermined value, means for stopping said current flow when said first voltage magnitude attains a second predetermined value, the difference between said first and said second predetermined values being substantially equal to said second voltage magnitude, output means having a first and a second alternative state, and means for connecting said output means in said current flow path to enable said output means from one of said states to the other in accordance with the presence or absence of said current flow.

2. In combination with a radiation detector providing a first electrical voltage having a magnitude proportional to detected radiation intensity, switching apparatus comprising a thyratron having an anode, a cathode, a control grid, means for establishing an operating potential between said anode and said cathode, a resistive element having one end connected to said grid, means connected between the other end of said resistive element and said cathode for establishing a unidirectional bias voltage between said control grid and said cathode to render said thyratron non-conductive, means for applying said first electrical voltage in series opposition to said bias voltage to initiate both plate current and grid current conduction in said thyratron, a second electrical voltage being produced across said resistive element by said grid current in series aid with said first electrical voltage magnitude to maintain said thyratron in said conducting mode, output means having a first and a second alternative state, and means responsive to said plate current for enabling said output means from one of said states to the other in accordance with the presence or absence of said current flow.

3. The subcombination substantially as set forth in claim 2 which further includes means for adjusting the magnitude of said second electrical voltage.

4. Apparatus comprising electrical means for generating pulses of current in response to nuclear radiation received at said electrical means, said means including a pair of output terminals, first circuit means having integrating means shunting said output terminals for converting said current pulses to a first electrical voltage, a thyratron having a plate, a cathode, and a control grid, said thyratron capable of conducting both plate and grid current, second circuit means connected to said grid to provide a resistive path for said grid current, means for connecting said first circuit means between said cathode and said second circuit means to initiate current conduction in said thyratron, said second circuit means providing a second electrical voltage in series aid with said first electrical voltage to maintain said thyratron in said conducting mode, output means having a first and a second alternative state, and means for enabling said output means from one of said states to the other in accordance with the operational mode of said thyratron.

5. Apparatus substantially as set forth in claim 4 which further includes means for adjusting the magnitude of said second electrical voltage.

6. Apparatus substantially as set forth in claim 4 including in said second circuit means for maintaining said control grid at a negative potential with respect to said cathode.

7. Apparatus substantially as set forth in claim 4 in which said second circuit means comprises a pair of serially connected resistive elements, and a pair of capacitive elements respectively connecting the common junction of said resistive elements, and said control grid to said cathode.

References Cited in the file of this patent
UNITED STATES PATENTS

| | | |
|---|---|---|
| 2,507,359 | Weisz | May 9, 1950 |
| 2,531,106 | Brown et al. | Nov. 21, 1950 |
| 2,651,726 | Froman et al. | Sept. 8, 1953 |
| 2,703,367 | Flarman | Mar. 1, 1955 |
| 2,728,861 | Glass | Dec. 27, 1955 |
| 2,758,712 | Linderman | Aug. 14, 1956 |